(12) United States Patent
Waters

(10) Patent No.: US 7,142,115 B2
(45) Date of Patent: Nov. 28, 2006

(54) METHOD OF ANNOTATING AN ITEM WITH ELECTRONIC DATA AND APPARATUS THEREFOR

(75) Inventor: John Deryk Waters, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 250 days.

(21) Appl. No.: 10/697,265

(22) Filed: Oct. 31, 2003

(65) Prior Publication Data

US 2004/0099743 A1    May 27, 2004

(30) Foreign Application Priority Data

Nov. 21, 2002    (GB)    ................................. 0227197.1

(51) Int. Cl.
*G08B 13/14* (2006.01)
(52) U.S. Cl. .................................................. 340/572.1
(58) Field of Classification Search ............. 340/572.1
See application file for complete search history.

(56) References Cited

U.S. PATENT DOCUMENTS

| | | | |
|---|---|---|---|
| 6,097,301 A | 8/2000 | Tuttle | |
| 6,259,369 B1 | 7/2001 | Monico | |
| 6,342,830 B1 * | 1/2002 | Want et al. | ................. 340/10.1 |
| 6,927,738 B1 * | 8/2005 | Senba et al. | ................. 343/787 |
| 2003/0225572 A1 * | 12/2003 | Adams et al. | ............... 704/201 |
| 2004/0134994 A1 * | 7/2004 | Zaba et al. | .................. 235/492 |
| 2004/0230887 A1 * | 11/2004 | Sellen et al. | ............. 715/500.1 |
| 2006/0030410 A1 * | 2/2006 | Stenton et al. | ................. 463/43 |
| 2006/0031119 A1 * | 2/2006 | Sellen et al. | .................. 705/14 |
| 2006/0187080 A1 * | 8/2006 | Slatter | ................... 340/825.22 |

FOREIGN PATENT DOCUMENTS

JP    2000-198334    7/2000

\* cited by examiner

*Primary Examiner*—Julie Bichngoc Lieu
(74) *Attorney, Agent, or Firm*—Foley & Lardner LLP

(57) ABSTRACT

A method and apparatus for annotating an item with electronic data secures a memory tag to the item. The memory tag has a memory and a transponder to enable wireless communication with the memory tag, and has an external dimension D. The memory tag is adapted for wireless communication only with a transceiver located within a distance of 10D of the memory tag.

22 Claims, 3 Drawing Sheets

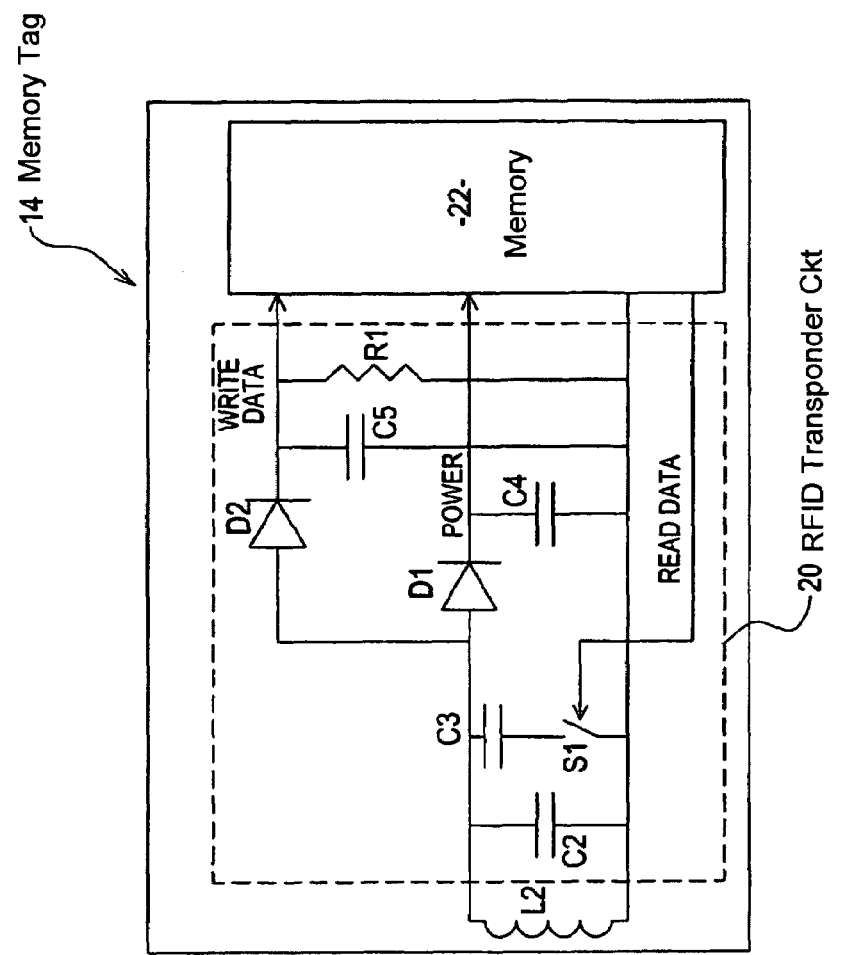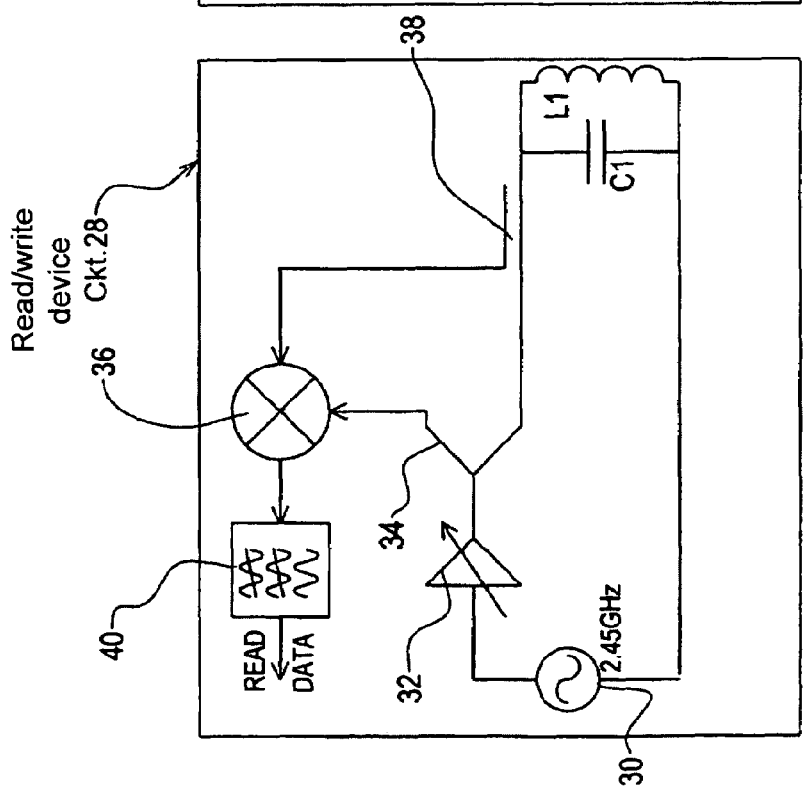
FIG 3

METHOD OF ANNOTATING AN ITEM WITH ELECTRONIC DATA AND APPARATUS THEREFOR

FIELD OF THE INVENTION

The invention relates to a method of annotating an item, in particular although not exclusively a document, with electronic data and apparatus therefor.

BACKGROUND OF THE INVENTION

Memory tags in the form of Radio Frequency Identification (RFID) tags are well known in the prior art. RFID tags come in many forms but all comprise an integrated circuit on which in use data can be stored and a coil which enables it to be interrogated by a reader which also powers it by means of an inductive (wireless) link. Generally RFID tags are quite large, due to the frequency they operate at (13.56 MHz) and the size of coil they thus require, and operate over large ranges and have very small storage capacities. Smaller RFID tags have also been developed, operating at various frequencies, but still having small storage capacities. Some RFID tags include Read Only Memory (ROM) and are written to at the time of manufacture, whilst others have read and write capability. RFID tags have tended to be used in quite simple applications, such as for file tracking within offices or in place of or in addition to bar codes for product identification and supply chain management.

One use to which such RFID tags can be put is the annotation of items, such as documents, with data over and above that printed on them. For example in EP 1 076 316 A2 Eastman Kodak Company describe the use of an RFID tag of conventional form secured to a print, being an output image on a substrate, possibly of a photograph. The kind of data which it is envisaged will be stored in the RFID tag on the print relates to the manner in which the print has been processed, particularly if the print is an output sheet from a proofing system. In any event the examples of data given range from 8 bits to 256 bits. A technique is described for communicating with multiple prints within range of the transceiver used to communicate with them, such as for example if a single print needs to be located amongst a file of such prints.

The present invention seeks to provide an improved method for annotation of items, such as documents, and apparatus for doing so.

SUMMARY OF THE INVENTION

According to a first aspect of the present invention there is provided a method of annotating an item with electronic data comprising securing a memory tag to the item, the memory tag comprising a memory and a transponder to enable wireless communication with the memory tag, and having an external dimension D, wherein the memory tag is adapted for wireless communication only with a transceiver located within a distance of 10D of the memory tag.

The memory tag may be adapted for wireless communication only with a transceiver located within a distance of 5D of the memory tag.

The memory tag is preferably adapted for wireless communication only with a transceiver located within a distance of 3D of the memory tag.

The method may include securing a plurality of memory tags to the item.

Conveniently the or each memory tag is an RFID tag in which the transponder includes an antenna coil and all components of the RFID tag, including the antenna coil, are provided on a chip.

The item may be a document comprising one or more sheets of paper.

According to a second aspect of the invention there is provided apparatus for annotating an item with electronic data wherein the apparatus comprises a memory tag which in use is secured to the item, and a transceiver for wireless communication with the memory tag, the memory tag including a memory and a transponder, and having an external dimension D, wherein the memory tag and transceiver are adapted for wireless communication therebetween only when the transceiver is located within a distance of 10D of the memory tag.

The memory tag and transceiver may be adapted for wireless communication therebetween only when the transceiver is located within a distance of 5D of the memory tag.

Preferably the memory tag and transceiver are adapted for wireless communication therebetween only when the transceiver is located within a distance of 3D of the memory tag.

The apparatus may include a plurality of memory tags.

Preferably the or each memory tag is powered as a result of wireless communication with the transceiver by inductive coupling.

The or each memory tag preferably is capable of having data read from it or written to it as a result of the wireless communication with the transceiver.

Conveniently the or each memory tag is an RFID tag in which the transponder includes an antenna coil and all components of the RFID tag, including the antenna coil, are provided on a single semiconductor chip.

The antenna coil may have five or fewer turns located around the periphery of the chip.

However preferably the antenna coil has two or a single turn located around the periphery of the chip.

The memory may conveniently be FRAM or MRAM and preferably has a capacity of at least 0.5 Mbits.

According to a third aspect of the invention there is provided an item annotated with electronic data stored on a memory tag secured to it, wherein the memory tag comprises a memory and a transponder to enable wireless communication with the memory tag, and has an external dimension D, wherein the memory tag is adapted for wireless communication only with a transceiver located within a distance of 10D of the memory tag.

The item may be annotated with electronic data according to the method of the first aspect of the invention and this may be performed using apparatus according to the second aspect of the invention.

BRIEF DESCRIPTION OF THE DRAWINGS

The method of the invention will now be described, as will an embodiment of apparatus for implementing it, with reference to the accompanying drawings in which:

FIG. 3 illustrates the circuitry of the memory tag of FIG. 2 and of a read/write device for wireless communication with the memory tag.

DETAILED DESCRIPTION OF THE PREFERRED EMBODIMENTS

Figure 1:
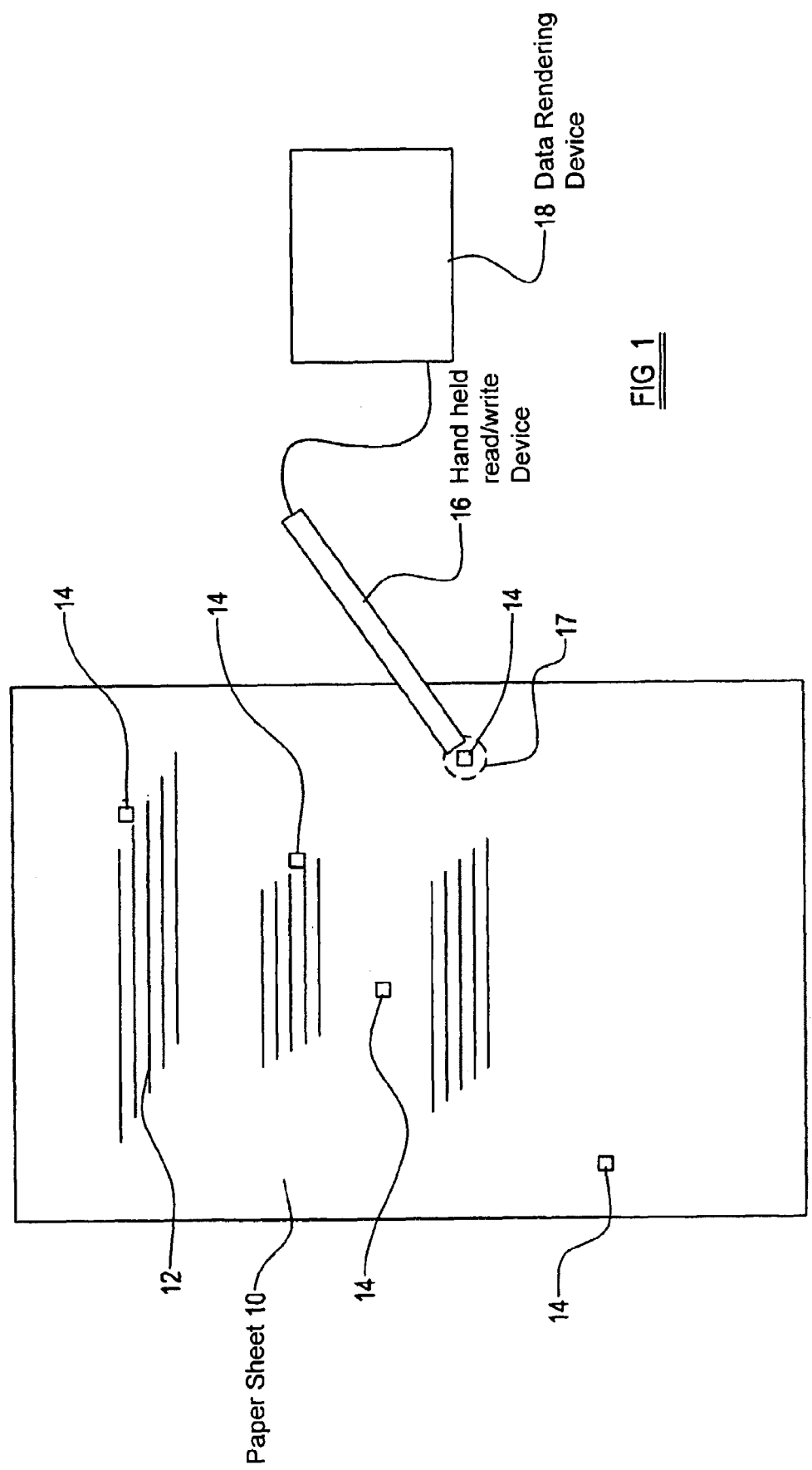
FIG. 1 illustrates a sheet of paper annotated with electronic data in accordance with the invention.

FIG. 1 illustrates an item, in this case a sheet of paper 10, bearing printing 12, which has been annotated with electronic data using a plurality of memory tags 14. The memory tags 14 have been secured to the sheet of paper 10 at various locations over it's surface, although they may alternatively be embedded in the paper sheet 10, preferably in locations identified by the printing 12, in order to assist in locating them for the purposes of reading data from or writing data to the memory tags 14.

A hand held read/write device 16 is used to communicate with the memory tags 14 in wireless manner, as will be discussed further below. The read/write device 16 is also connected to a host computer, display, data rendering device or other apparatus 18 from which the data for writing to the memory tags 14 is received, and/or the data read from the memory tags 14 is passed.

Figure 2:
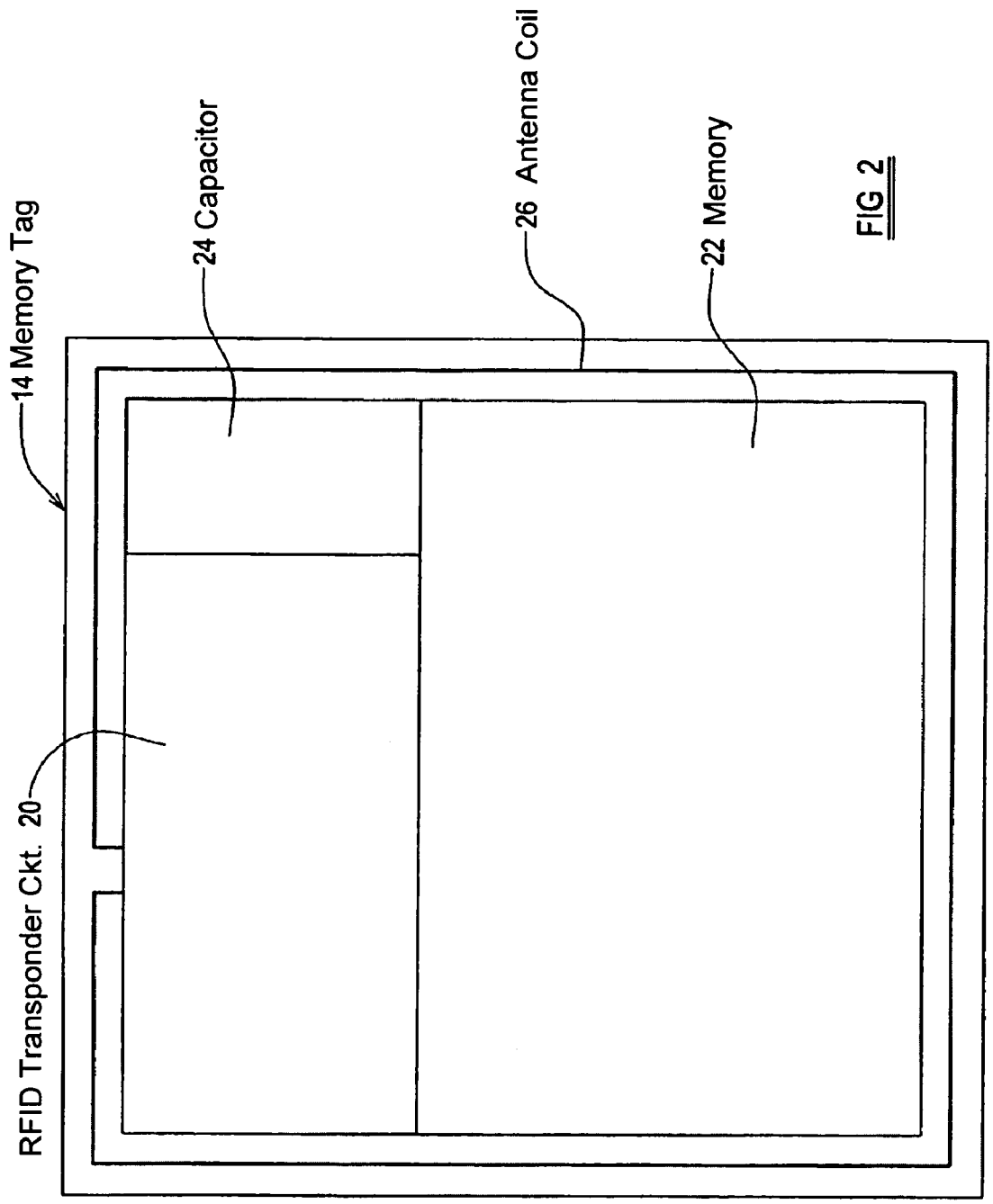
FIG. 2 illustrates an RFID memory tag for use in the method of the invention.

Referring now to FIG. 2, a schematic of a memory tag 14 is shown. The memory tag 14 is an RFID memory tag provided on a single semiconductor chip, and comprises an RFID transponder circuit 20, a memory 22, a power supply capacitor 24 and an antenna coil 26 having only a few turns e.g. five, or as in this case a single turn. The RFID transponder circuit 20 operates at 2.45 GHz, is of an area of approximately 0.5 mm$^2$, and will be described further below. The memory 22 provides 1 Mbit of capacity of non-volatile memory and is of an area of approximately 1 mm$^2$, and uses FRAM (ferroelectric random access memory) or MRAM (magnetoresistive random access memory) or similar memory technology requiring low power. The memory tags 14 are of a substantially square shape in plan view with an external dimension D for their sides of around 1 mm.

Referring now to FIG. 3, the circuitry of a memory tag 14 and circuitry 28 of the read/write device 16 are illustrated schematically, using conventional component identifications (C-capacitor, L-inductance, R-resistor, D-diode and S-switch). The RFID transponder circuit 20 of the memory tag 14 comprises a capacitor C2 which, in combination with the antenna coil L2(26), forms a resonant circuit with component values being chosen to tune the combination to approximately 2.45 GHz for inductive coupling with the read/write device 16. The portion of transponder circuit 20 responsible for power supply is diode D1 and capacitor C4(24), with diode D1 rectifying the alternating current generated by the inductive coupling and the capacitor C4 acts as a power supply storage. The portion of the transponder circuit 20 responsible for receiving transmitted data from the read/write device 16 is diode D2, capacitor C5 and resistor R1 which form a simple envelope detector; the data thus received is stored in memory 22. The portion of the transponder circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to the read/write device 16.

The circuit 28 of the read/write device 16 comprises a signal generator 30 which generates a signal at the chosen frequency of 2.45 GHz. This signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to the memory tag 14.

The splitter 34 takes a part (as much as 50% of the power) of the amplitude modulated signal, for use as a reference signal, and passes it to a multiplier 36. The signal received from the memory tag 14, via the tuned circuit L1/C1 and divided from the outgoing signal by a coupler 38, is also passed to the multiplier 36. Thus the transmitted amplitude modulated signal and received signal are multiplied and then pass through a low pass filter 40 to provide a signal comprising the phase modulation from the memory tag 14 and thus indicative of the data read from the memory tag 14. This signal is then passed to the host computer or other device 18 to which the read/write device 16 is connected, for subsequent data processing.

One amplitude modulation format which may be used to apply the data to be transmitted to the 2.45 GHz signal is Amplitude Shift Keying (ASK) which only requires the simple envelope detector D2/C5 described in the circuit 20. However, other amplitude modulation formats may also be employed. Further alternatives are Frequency Shift Keying (FSK) and Phase Shift Keying (PSK) that provide near constant envelope modulation, that is without any significant amplitude modulation, however these options have more complex demodulation requirements and thus demand more complex circuitry in the memory tag 14.

With the apparatus of memory tag 14 and read/write device 16 described above power transfer of around 25% can be achieved with a distance of around 1.8 mm between the antennae L1 and L2, of the read/write device 16 and memory tag 14 respectively. This is sufficient to transfer enough power to the memory tag 14 for it to operate.

The memory tags 14 have an external dimension D of around 1 mm, as described above, and therefore the read/write device 16 can communicate with them over a relatively short range, in this example of approximately 2D, (as illustrated on FIG. 1 by broken circle 17). However, the distance over which the read/write device 16 and memory tag 14 will communicate effectively will clearly vary with the exact details of their construction, and it may therefore be up to 10D. Distances greater than this would limit the ability to use a plurality of memory tags 14 on a single sheet of paper 10, or other item, due to the distances which would be necessary between the memory tags 14 to ensure that the read/write device 16 does communicate with the desired memory tag 14 out of a number present. To ensure that communication is with the correct memory tag 14 in every circumstance a communication distance of 5D or less is preferable.

The memory tags 14 will preferably have a data rate of 10 Mbitss$^{-1}$, which is two orders of magnitude faster than is typical in prior art devices. Such a data rate would enable the read/write device 16 to be held over the memory tag for a very short period of time ("brush and go") for the data to be read or written as appropriate.

Although the memory tags 14 described above operate at 2.45 GHz it should be understood that memory tags operating at other frequencies may be used to implement the invention. Factors affacting the choice of operating frequency for the memory tags are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

The invention claimed is:

1. A method of annotating an item with electronic data comprising securing a memory tag to the item, the memory tag comprising a memory and a transponder to enable wireless communication with the memory tag, and having an external dimension D, wherein the memory tag is adapted for wireless communication only with a transceiver located within a distance of 10D of the memory tag.

2. A method according to claim 1 wherein the memory tag is adapted for wireless communication only with a transceiver located within a distance of 5D of the memory tag.

3. A method according to claim 2 wherein the memory tag is adapted for wireless communication only with a transceiver located within a distance of 3D of the memory tag.

4. A method according to claim 1 wherein it includes securing a plurality of memory tags to the item.

5. A method according to claim 1 wherein the or each memory tag is an RFID tag in which the transponder includes an antenna coil and all components of the RFID tag, including the antenna coil, are provided on a single semiconductor chip.

6. A method according to claim 1 wherein the item is a document which comprises one or more sheets of paper.

7. Apparatus for annotating an item with electronic data wherein the apparatus comprises a memory tag which in use is secured to the item, and a transceiver for wireless communication with the memory tag, the memory tag including a memory and a transponder, and having an external dimension D, wherein the memory tag and transceiver are adapted for wireless communication therebetween only when the transceiver is located within a distance of 10D of the memory tag.

8. Apparatus according to claim 7 wherein the memory tag and transceiver are adapted for wireless communication therebetween only when the transceiver is located within a distance of 5D of the memory tag.

9. Apparatus according to claim 8 wherein the memory tag and transceiver are adapted for wireless communication therebetween only when the transceiver is located within a distance of 3D of the memory tag.

10. Apparatus according to claim 7 wherein it includes a plurality of memory tags.

11. Apparatus according to claim 7 wherein the or each memory tag is powered as a result of wireless communication with the transceiver by inductive coupling.

12. Apparatus according to claim 7 wherein the or each memory tag is an RFID tag in which the transponder includes an antenna coil and all components of the RFID tag, including the antenna coil, are provided on a single semiconductor chip.

13. Apparatus according to claim 12 wherein the antenna coil has five or fewer turns located around the periphery of the chip.

14. Apparatus according to claim 13 wherein the antenna coil has two or a single turn located around the periphery of the chip.

15. Apparatus according to claim 7 wherein the memory is FRAM or MRAM.

16. Apparatus according to claim 7 wherein the memory has a capacity of at least 0.5Mbits.

17. An item annotated with electronic data stored on a memory tag secured to it, wherein the memory tag comprises a memory and a transponder to enable wireless communication with the memory tag, and has an external dimension D, wherein the memory tag is adapted for wireless communication only with a transceiver located within a distance of 10D of the memory tag.

18. An item annotated with electronic data according to the method of securing a memory tag to the item, the memory tag comprising a memory and a transponder to enable wireless communication with the memory tag, and having an external dimension D, wherein the memory tag is adapted for wireless communication only with a transceiver located within a distance of 10D of the memory tag.

19. An item annotated with electronic data using apparatus comprising a memory tag which in use is secured to the item, and a transceiver for wireless communication with the memory tag, the memory tag including a memory and a transponder, and having an external dimension D, wherein the memory tag and transceiver are adapted for wireless communication therebetween only when the transceiver is located within a distance of 10D of the memory tag.

20. A method of annotating an item with electronic data comprising securing an RFID tag to the item, the RFID tag being provided on a single semiconductor chip having an external dimension D and comprising a memory and a transponder having an antenna coil to enable wireless communication with the RFID tag, wherein the RFID tag is adapted for wireless communication only with a transceiver located within a distance of 10D of the RFID tag.

21. Apparatus for annotating an item with electronic data wherein the apparatus comprises an RFID tag which in use is secured to the item, and a transceiver for wireless communication with the RFID tag, the RFID tag including a memory and a transponder with an antenna coil, and being provided on a single semiconductor chip having an external dimension D, wherein the RFID tag and transceiver are adapted for wireless communication therebetween only when the transceiver is located within a distance of 10D of the RFID tag.

22. An item annotated with electronic data stored on an RFID tag secured to it, wherein the RFID tag comprises a memory and a transponder having an antenna coil to enable wireless communication with the RFID tag, and is provided on a single semiconductor chip which has an external dimension D, and wherein the RFID tag is adapted for wireless communication only with a transceiver located within a distance of 10D of the RFID tag.

* * * * *